(12) United States Patent
Nemir et al.

(10) Patent No.: US 9,573,324 B2
(45) Date of Patent: Feb. 21, 2017

(54) PRESSURIZED ANNEAL OF CONSOLIDATED POWDERS

(71) Applicants: David Charles Nemir, El Paso, TX (US); Edward S. Rubio, Santa Teresa, NM (US); Jan Bastian Beck, El Paso, TX (US)

(72) Inventors: David Charles Nemir, El Paso, TX (US); Edward S. Rubio, Santa Teresa, NM (US); Jan Bastian Beck, El Paso, TX (US)

(73) Assignee: TXL GROUP, INC., El Paso, TX (US)

( * ) Notice: Subject to any disclaimer, the term of this patent is extended or adjusted under 35 U.S.C. 154(b) by 69 days.

(21) Appl. No.: 14/729,439

(22) Filed: Jun. 3, 2015

(65) Prior Publication Data

US 2015/0360422 A1   Dec. 17, 2015

Related U.S. Application Data

(60) Provisional application No. 62/010,916, filed on Jun. 11, 2014.

(51) Int. Cl.

| | | |
|---|---|---|
| B22F 3/24 | (2006.01) | |
| B22F 3/08 | (2006.01) | |
| B29C 43/52 | (2006.01) | |
| B01J 3/08 | (2006.01) | |
| B29C 67/04 | (2006.01) | |

(Continued)

(52) U.S. Cl.
CPC ............ *B29C 67/04* (2013.01); *B01J 3/08* (2013.01); *B22F 3/02* (2013.01); *B22F 3/03* (2013.01); *B22F 3/08* (2013.01); *B29C 43/52* (2013.01); *B22F 2003/248* (2013.01); *B29L 2031/34* (2013.01)

(58) Field of Classification Search
None
See application file for complete search history.

(56) References Cited

U.S. PATENT DOCUMENTS 3,992,202 A  *  11/1976  Dulis ................. B22F 3/15
                                                    419/49
4,673,549 A  *   6/1987  Ecer .................. B22F 3/02
                                                    264/125

(Continued)

FOREIGN PATENT DOCUMENTS

WO        8606057      10/1986

OTHER PUBLICATIONS

Meyers, M. et al., "Shock-Wave Consolidation of Rapidly Solidified Superalloy Powders", Journal of Metals (1998), p. 21-26, vol. 33, No. 10.

(Continued)

*Primary Examiner* — Mary F Theisen
(74) *Attorney, Agent, or Firm* — Winstead PC (57) ABSTRACT

Systems and methods for producing a dense, well bonded solid material from a powder may include consolidating the powder utilizing any suitable consolidation method, such as explosive shockwave consolidation. The systems and methods may also include a post-processing thermal treatment that exploits a mismatch between the coefficients of thermal expansion between the consolidated material and the container. Due to the mismatch in the coefficients, internal pressure on the consolidated material during the heat treatment may be increased.

21 Claims, 8 Drawing Sheets

PRECOMPACTION     POSTCOMPACTION (51) Int. Cl.
  *B22F 3/03* (2006.01)
  *B22F 3/02* (2006.01)
  B29L 31/34 (2006.01)

(56) References Cited

U.S. PATENT DOCUMENTS

| | | | |
|---|---|---|---|
| 4,925,501 A | 5/1990 | Harasek | |
| 5,549,731 A | 8/1996 | Cline et al. | |
| 5,826,160 A | 10/1998 | Kecskes | |
| 7,364,628 B2 | 4/2008 | Kakimoto et al. | |
| 7,513,198 B2 | 4/2009 | Zhang et al. | |
| 8,037,831 B2 | 10/2011 | Zhang et al. | |
| 8,668,866 B2 | 3/2014 | Rubio et al. | |
| 2012/0119060 A1* | 5/2012 | Kuntz | B29C 33/38 |
| | | | 249/80 |

OTHER PUBLICATIONS

Guruswamy, S. et al., "Explosive compaction of Magnequench Nd—Fe—B magnetic powders", Faculty Publications from Nebraska Center for Materials and Nanoscience (1996), Paper 44.
Gourdin, W.H., "Energy deposition and microstructural modification in dynamically consolidated metal powders", J. Appl. Phys. (1984), p. 172-181, vol. 55, No. 1.

\* cited by examiner

FIG 4a PRECOMPACTION

FIG 4b POSTCOMPACTION

PRECOMPACTION
FIG 5a

POSTCOMPACTION
FIG 5b

PRESSURIZED ANNEAL OF CONSOLIDATED POWDERS

CROSS-REFERENCE TO RELATED APPLICATIONS

This application claims priority to U.S. provisional patent application 62/010,916 filed Jun. 11, 2014, which is incorporated by reference herein in its entirety.

STATEMENT REGARDING FEDERALLY SPONSORED RESEARCH

This invention was made with Government support under contract NNX10CB69C awarded by NASA. The Government has certain rights in this invention.

FIELD OF THE INVENTION

This invention relates to a system and method for producing a dense, well-bonded bulk material.

BACKGROUND OF THE INVENTION

Materials are often produced by heating them to a liquid state and then allowing the molten material to cool. The way in which a molten material cools to a solid state can impacts the properties of the end material and controlled cooling or "quenching" can be exploited to tailor the material properties by adjusting the microstructural make-up. In the solid state, many materials form coherently diffracting domains, which are also known as grains or crystallites. When the material is in powder form and the average grain size is in the range of 100 nanometers to 10 micrometers, the powders may be referred to as micropowders. When the average grain size is equal to or less than 100 nanometers in all dimensions, the powder may be referred to as a nanopowder. When mean grain sizes of respectively, 100 nanometers to 10 micrometers, or equal to or less than 100 nanometers, are present in a bulk material, that material is said to be "microstructured" or "nanostructured". It shall be understood that the dimensions for micropowders, nanopowders, microstructured, or nanostructured discussed above are merely illustrative and nonlimiting. It shall be understood that these definitions do not strictly adhere to the ranges discussed.

To understand the scale of size reduction, it is useful to consider a single crystal of common table salt, or sodium chloride. The common table salt form is a cube of approximate dimensions of 300 micrometers on a side. Compared to this salt crystal, a micropowder particle that is cubic with a dimension of 300 nanometers is a thousand times smaller in dimension on each side and has one billionth of the volume. The surface area to volume ratio of a cube is inversely proportional to length, so if one billion cubes of dimension 300 nanometers on a side were arranged to make up a cube the size of the example table salt crystal, there would be a total surface area that was one thousand times as great, due to all of the surfaces at the interfaces between cubes. If one considers a particle that is cubic with dimension of 30 nanometers on a side, then there is another factor of 1000 reduction in volume and a factor of ten increase in surface area to volume ratio. The concept of surface area of crystalline grains is an important one when considering nanostructured bulk materials since interfaces occur at grain boundaries at the surfaces of grains. With smaller grains, a given volume of bulk material will have more interfaces.

A material with small grains can have very different macroscale properties compared to a more conventional, large grained bulk solid even though both have an identical chemical make-up. For example, as the grains of a densified bulk material are reduced in size (depending upon material) from tens of micrometers to a few micrometers and further into the nanoscale, the yield strength increases—a phenomena characterized by the Hall-Petch relation and given by the formula:

$$\sigma_y = \sigma_0 + \frac{K_y}{\sqrt{d}}, \quad (1)$$

where $\sigma_y$ is the yield strength, d is the grain size and $\sigma_0$ and $k_y$ are material constants. The Hall-Petch relation does not hold as grain sizes are reduced into the sub 100 nm region because the abundance of weaker grain boundaries softens the structure, allowing a greater degree of plastic deformation and ductility. Material strength may continue to increase with grain size reduction but that increase occurs by an amount that is less than the level suggested by equation (1). As such, a nanostructured bulk material may exhibit both higher strength and higher ductility (together a property known as "toughness") than its larger grained counterpart.

Another example of the use of small grain sizes to engineer desirable material properties is its use in reducing thermal conductivity in thermoelectric materials. In a nanostructured bulk material, the presence of a high density of grain boundaries, lattice defects and scattering centers can serve to decrease the thermal conductivity of a material by impeding phonon transport. Phonons are quanta of lattice vibration and they have a distribution of characteristic wavelengths that are material dependent. In a single large crystal, the mean free path of the phonons can be many wavelengths long. In contrast, the presence of many grain boundaries in a nanostructured material shortens the phonon mean free path and thereby reduces the thermal conductivity due to phonon scattering at grain boundaries. For example, reduced thermal conductivity is an attractive feature for a thermoelectric heat pump because it reduces the lattice heat flow that is counter to the desired pumping direction. Reduced thermal conductivity is attractive for a thermoelectric generator because it reduces the amount of diffusive heat energy flux that passes through the thermoelectric elements without being converted to electricity.

Fine grained bulk materials may be made by consolidating powders having a large proportion of micro-scale or nano-scale crystallites. These fine grained powders can be produced through a variety of well-documented processes including mechanical milling, chemical synthesis, melt-spinning and gas atomization. However, it is challenging to fashion a dense bulk material from powders without a significant increase in the mean size of the grains.

Converting a powder into a solid may be accomplished through a combination of compaction and heat treating. The objective of the compaction step is to obtain high density. The heat treating step then serves to enhance interparticle bonding and reduce intergranular voids. Compaction and heating can be carried out simultaneously.

Compaction can be accomplished through one of a number of approaches. In uniaxial die compaction, a punch compresses powder in a rigid-walled die. Isostatic pressing techniques use a flexible die, which is sealed with powder inside and is submerged in a fluid chamber which is then hydrostatically compressed. In contrast to uniaxial and isostatic compression, which are static compression techniques, shockwave consolidation represents a means to accomplish compaction dynamically. In this technique, an explosive shockwave travels down a powder filled tube, with the very high energy compaction wave causing powder particles to plastically deform and consolidate. During this process there are two sources of heating. First, the surface energy of the powder is higher than the interface energy of the compact. The extra energy gets converted to heat. Second, the deformation of the individual particles and rearranging of atoms on the interface cause heating due to internal friction. More heating occurs at the surface of individual particles, in some cases causing melting at the interfaces, which are then cooled by the particle. As the shock wave travels through the powder, it has to supply the energy for the plastic deformation of the individual particles. This effect serves to diminish the intensity of the wave as it travels from the outside of the pipe to the center. At the same time, the shockwave converges from all radial directions towards the center of the pipe. This convergence serves to increase the intensity of the wave as it travels from the outside of the pipe to the center. These two effects should be carefully balanced to obtain a uniform consolidate.

Shockwave consolidation sometimes yields an incompletely bonded and/or low density material. A post heat treatment then becomes necessary, but the applied temperatures can cause undesirable grain growth. When a fine-grained end product is desired, the challenge is obtaining high density and good interparticle bonding while preserving small grains. The key variables of temperature, pressure and time are all important and can be traded off to obtain a given result.

Various shockwave consolidation techniques have been disclosed, such as in "Shock-Wave Consolidation of Rapidly Solidified Superalloy Powders", by M. Meyers, B. Gupta and L. Murr, *Journal of Metals*, vol. 33, no. 10, October 1981, pp 21-26, U.S. Pat. No. 5,826,160 to Kecskes, U.S. Pat. No. 7,364,628 B2 to Kakimoto et al., and U.S. Pat. No. 8,668,866 to Rubio and Nemir. However, it can still be challenging to obtaining high density and good interparticle bonding while preserving small grains in the bulk material with known shockwave consolidation processes.

Systems and methods for producing a dense, well-bonded, fine grained bulk material are discussed further herein. The systems and methods may utilize shock-wave consolidation or any other suitable consolidation technique as a mechanism for compacting powders into a bulk solid while preserving grain size. The resulting bulk material within an enclosing container may also be thermally processed to enhance densification and inter-particle bonding.

SUMMARY OF THE INVENTION

In some embodiments, systems and methods for producing dense bulk fine-grained materials having good interparticle bonding include producing a high density compact, such as through a shockwave consolidation or any other suitable consolidation technique for a powder that has been loaded into a specially chosen tube or container. The tube may be selected to be of a ductile material with a thermal coefficient of expansion that is much different from that of the consolidate. The tube may be further selected to have a thickness that will allow the imposition of a desired pressure upon the consolidate. After the consolidation, the consolidated powder, which is now a bulk material, remains in a pressurized state within the tube due to residual mechanical stresses by the tube acting upon the consolidate. By exploiting a mismatch in thermal coefficients of expansion between tube and consolidate, a postprocessing heat or cold treatment on the jacketed consolidate, while it is still located in the tube, can serve to add additional pressure to the consolidate causing interparticle bonding to be accomplished in minimal time and avoiding the excessive grain growth of alternative methods and in some cases, allowing the retention of microstructural stresses.

In some applications, it may be desirable to apply a post processing heat or cold treatment in such a way as to preferentially allow grain growth in a selected axis, thereby resulting in an anisotropic bulk material. In some embodiments, preferential grain growth may be achieved my removing a portion of the consolidated powder prior to the thermal treatment, thereby reducing the potential forces exerted on the powder during thermal treatment. In some applications, it may be desirable to temperature treat sections of the compacted bulk consolidate that have been retained in rings of the original tube material.

The foregoing has outlined rather broadly various features of the present disclosure in order that the detailed description that follows may be better understood. Additional features and advantages of the disclosure will be described hereinafter.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Refer now to the drawings wherein depicted elements are not necessarily shown to scale and wherein like or similar elements are designated by the same reference numeral through the several views.

Referring to the drawings in general, it will be understood that the illustrations are for the purpose of describing particular implementations of the disclosure and are not intended to be limiting thereto. While most of the terms used herein will be recognizable to those of ordinary skill in the art, it should be understood that when not explicitly defined, terms should be interpreted as adopting a meaning presently accepted by those of ordinary skill in the art.

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

Systems and methods for producing a dense, well-bonded, fine grained bulk material are discussed in detail herein. In some embodiments, a powder may be loaded into a tube for shockwave consolidation to produce a high density compact. In other embodiments, a high density compact may be produced from a powder by any suitable static compression technique, isostatic pressing, uniaxial die compaction, or the like. In some embodiments, material to be compacted may be a nanopowder with an average crystallite size of equal to or less than 100 nanometers. A tube or container for the powder may be carefully selected based on ductility, wall thickness, thermal coefficient of expansion relative to the material to be consolidated, and/or desired pressure to be imposed on the consolidate after shockwave consolidation. When the powder has been consolidated to form a bulk material, it may remain in a pressurized state from residual mechanical stresses exerted by the tube wall. The terms consolidate, consolidated powder, bulk material, compact, and compacted powder shall be utilized interchangeably herein to refer to a powder that has been consolidated by any suitable means to form a single piece of material.

In some embodiments, it may be desirable to section the tube utilizing any suitable means, such as by machining. After sectioning, the consolidated material continues to be encircled by the tube material. In some embodiments, it may be desirable to machine away a small layer, such as from the top and/or bottom of the consolidated powder. By removing small layer(s), and thereby allowing room for expansion, the orientation of grain growth may be controlled during thermal treatment. In some embodiments, the heat or cold treatment may preferentially allow grain growth in a selected axis to provide an anisotropic bulk material.

In some embodiments, bulk material that remains pressurized in a tube or section may be subjected to a thermal treatment, either heating or cooling, while still in the tube or section. The thermal treatment may be provided by any suitable thermal treatment device, such as, but not limited to, an oven, freezer or refrigerator. By carefully selecting the tube, a mismatch in thermal coefficients of expansion between the tube and bulk material can be exploited to add a controllable pressure during the thermal treatment. This additional pressure may allow post processing objectives such as improved interparticle bonding, void closures and material densification to be accomplished in less time than the equivalent thermal treatment without the added pressure. The additional pressure may further allow the densification into a bulk material without excessive grain growth Any suitably shaped container may be utilized to receive and retain the powder. As nonlimiting examples, the container may be a hollow cylinder or tube of any shape including a right circular cylinder, elliptic cylinder, parabolic cylinder, or hyperbolic cylinder. Further, the container may be a hollow cuboid or hexahedron. In some embodiments, a clamp may be utilized to exert pressure on the consolidated powder. In some embodiments, a clamp may be utilized to exert pressure on the consolidated powder during the thermal processing. As a nonlimiting example, the clamp may include two plates that are fastened together to sandwich a section of the hollow container and consolidated powder in between the plates. Fasteners and/or plates may be selected from materials with a different coefficient of thermal expansion than the consolidated powder. In some embodiments, the plates may provide raised areas. In some embodiments, one of the plates may freely slide relative to fasteners. Further, springs may be coupled to the fasteners and plates.

By choosing the container and/or clamp material in such a way as to exploit a mismatch between thermal coefficients of the container/clamp and consolidated powder (or consolidate), high internal pressures can be obtained through the application of heat or cold. Due to the mismatch in thermal coefficients, the expansion or contraction of the container/clamp and consolidate with a change in temperature will be different. For example, the consolidate may expand at a greater rate with increasing temperature relative to the container/clamp thereby leading to internal pressure between the container/clamp and consolidate. This represents an effective, high volume means for accomplishing densification and interparticle bonding without significant grain growth. When an anisotropic grain growth is desired, the method can be adjusted to promote grain growth preferentially along one axis. In cases where microstress retention is desired, cold treatment may be used instead of a heat treatment.

Figure 1:
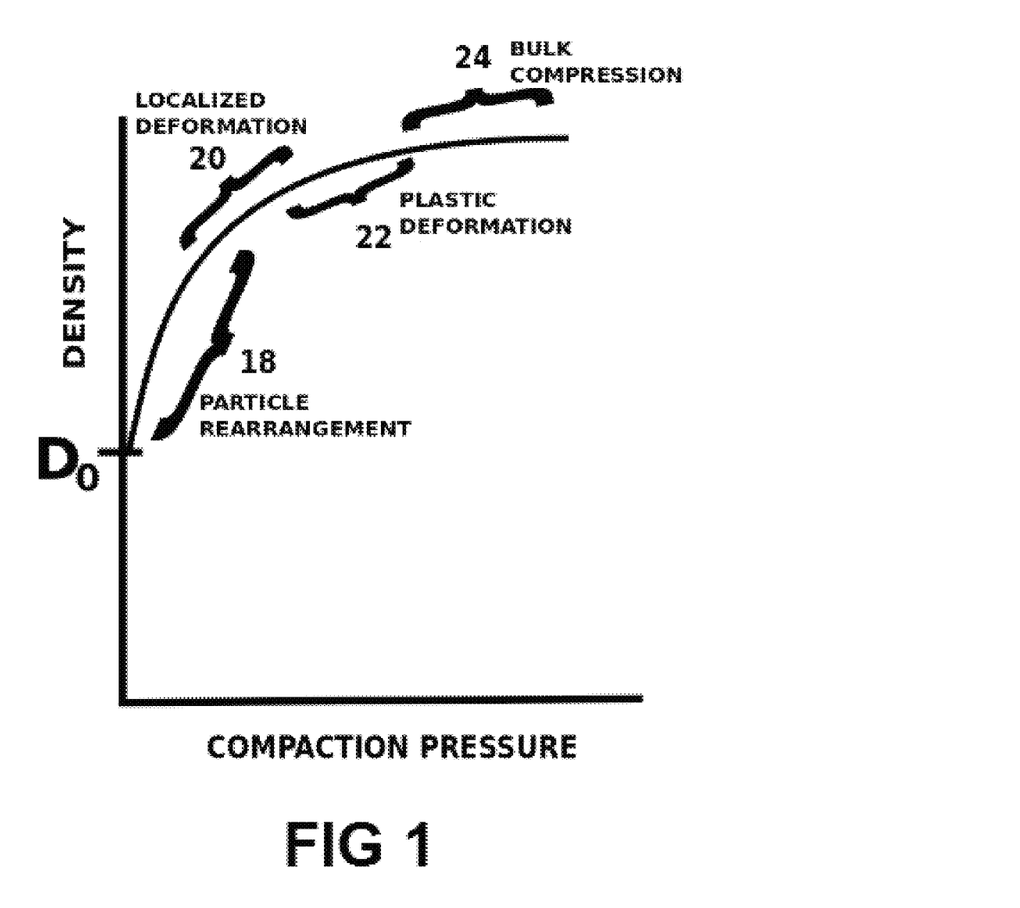
FIG. 1 depicts the relationship between compaction pressure and the resulting density of the bulk material.

FIG. 1 depicts the relationship between compaction pressure and the density that can be obtained. This mechanism is the same for both static compaction (e.g. an axial press) and dynamic compaction (e.g. shockwave powder consolidation). The initial density is $D_0$ and is the so-called "tap density" reflecting the initial compaction. For any given material, the higher the initial density, the less post processing that will be needed to obtain any given densification objective. When pressure is applied, the particles begin to arrange themselves into a more tightly packed configuration, resulting in a rapid increase of density. This is the region of particle rearrangement 18. When the particles are very tightly packed, additional pressure causes the point contacts between particles to begin to deform and the number of particles touching a given particle increases. This region of localized deformation is denoted as 20. In the plastic deformation region 22, particle deformation occurs and voids close. Finally, in region 24 there is bulk compression with little increase in density when additional compaction pressure is added. The regions are not mutually exclusive and there may be more than one mechanism for densification at any given compaction pressure.

Figure 2A:
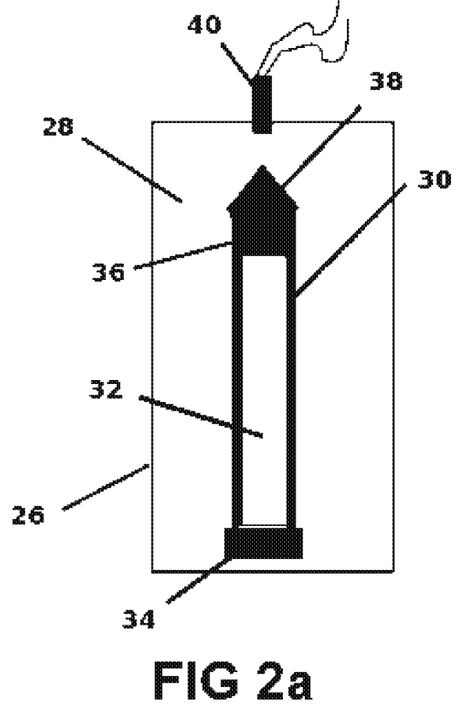
FIGS. 2a-2b respectively depict an apparatus for shockwave powder consolidation and a dynamic wave applied to the apparatus during shockwave powder consolidation.
Figure 2B:
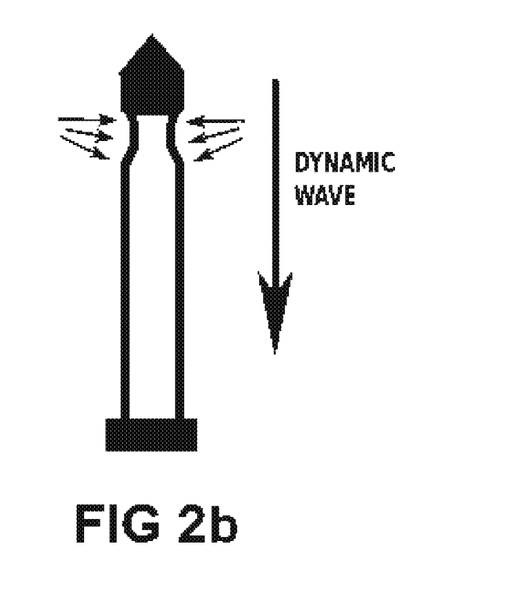

FIGS. 2a-2b depict a set-up for shockwave consolidation that relies upon detonation to apply a dynamic pressure pulse, or dynamic wave to the apparatus during shockwave powder consolidation. A powder tube 30 that is constructed from a ductile material, such as zinc, lead, aluminum, copper, bismuth, nickel or steel holds a powder 32 that has been compacted to an initial tap density. It is important that powder tube 30 is sufficiently ductile so that it plastically deforms under the imposition of a shockwave in a way as to continue to hold the consolidated powder without rupturing. The ends of powder tube 30 are sealed with plugs 34 and 36. The sealed tube 30 is placed in the center of a larger outer container 26, such as a cylinder, which is filled with an explosive material 28. A detonator 40 initiates the explosion and the resulting shockwave travels downward through the cylinder 26, causing the tube 30 to reduce in diameter as the pressure pulse travels downward. Cone 38 serves to impedance match the pulse as it descends. As detonation proceeds downwards, it produces a pressure pulse which is calculated as $$P_D = \frac{1}{4}\rho_0 V_D^2 \quad (2)$$

where $P_D$ is detonation pressure, $\rho_0$ is the density of the explosive material and $V_D$ is the detonation velocity. $V_D$ and $\rho_0$ are characteristic of both the explosive material that is used and the overall set-up. A suitable explosive may be ammonium nitrate/fuel oil (ANFO). In a common "prill" form, a reasonable value for the density of ANFO would be 840 kg/m$^3$. A corresponding unconfined detonation velocity would be on the order of 3,200 m/sec. So, for ANFO, the detonation pressure using equation (2) may be calculated as 2.3 gigapascal. This is a much higher pressure than can be obtain with a traditional uniaxial press. In addition, it is a dynamic pressure pulse that occurs very quickly, serving to "wipe" particles past one another, exposing surfaces, filling voids and enhancing bonding. With a velocity of 3,200 m/sec, it takes only 100 μsec for a shockwave to travel down the length of a 32 cm long tube. Because the pressure pulse occurs so quickly, there is virtually no heat energy flux from the detonation products that passes into the powder. As such, the process may be considered to be thermodynamically adiabatic. It should be noted that the detonation velocity can be increased by confining the explosive, in other words, by putting mass around the explosive. Explosives are also self-confining, meaning larger masses of explosives detonate with higher velocity. Density can be increased by compacting the explosive prior to detonation or can be reduced by mixing an inert material into the explosive. The pressure applied to the powder can be increased by the use of additional tubes, sometimes called flyer tubes, surrounding the powder tube, but separated from the powder tube by a gap.

Figure 3:
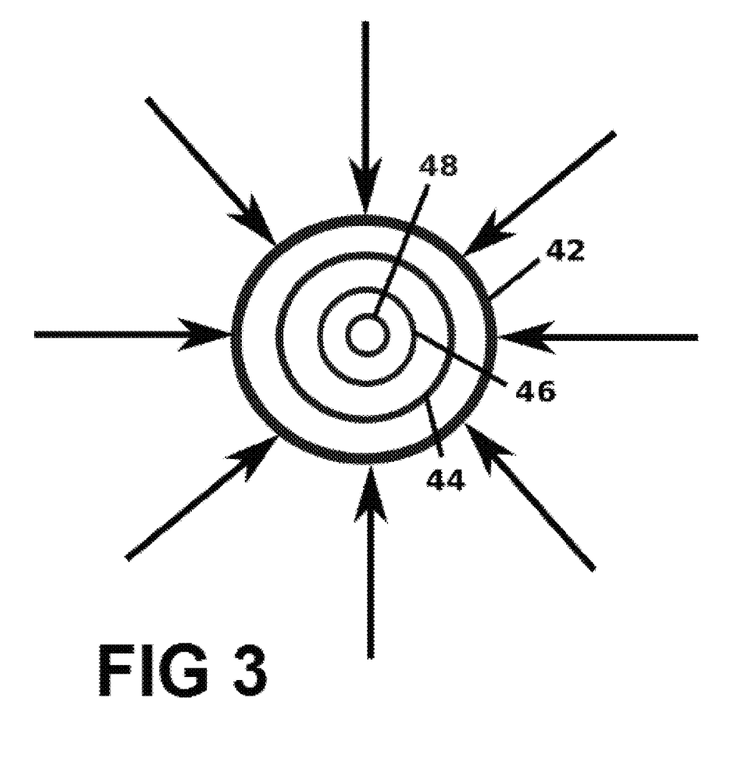
FIG. 3 depicts the time evolution of a shock-wave through a cross-section of the powder tube.

FIG. 3 depicts a two dimensional slice of the powder tube as seen from above, depicting the way in which the shockwave converges with time into the center. As the shock-wave travels down the tube and reaches the two-dimensional cross-section, at time $t_0$, a pressure wave is applied from all directions to powder tube wall 42. This pressure wave converges into the interior with a circular wave front 44 at some later time $t_1$, a circular wave front 46 at some later time, $t_2$, and a circular wave front 48 at some later time, $t_3$. The pressure wave eventually converges to the center of the tube. If there were no energy converted to heat or used up in bonding particles when consolidating powder, then the pressure would continually increase, theoretically approaching infinity at the centerline. However, the plastic deformation of the powder particles causes heating within the grains. The energy for this comes from the shockwave, serving to diminish it. The surface energy of the powder is lower than the interfacial energy in the compact. This surplus of energy causes increased local heating at the powder particle interfaces during consolidation. This, in turn, can cause local melting and the closing of voids. The two mechanisms, (one serving to concentrate the shockwave, one diminishing it) have to be carefully balanced in order to achieve a uniform compact. In the ideal case, there is a uniform pressure applied to all particles as the pressure wave moves toward the tube's central axis with the tendency for energy increase with convergence being offset by energy being "consumed" as powder is consolidated into a bulk material.

Figures 4A, 5A:
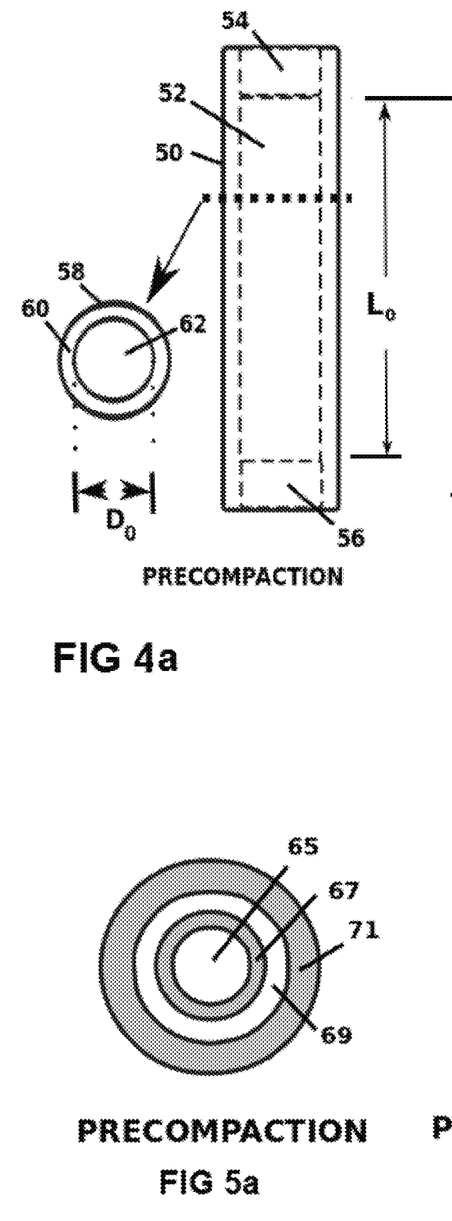
FIGS. 4a-4b respectively depict a powder-filled tube before and after shockwave compaction.
FIGS. 5a-5b respectively depict a cross-section of a double tube configuration before and after shockwave compaction.
Figures 4B, 5B:
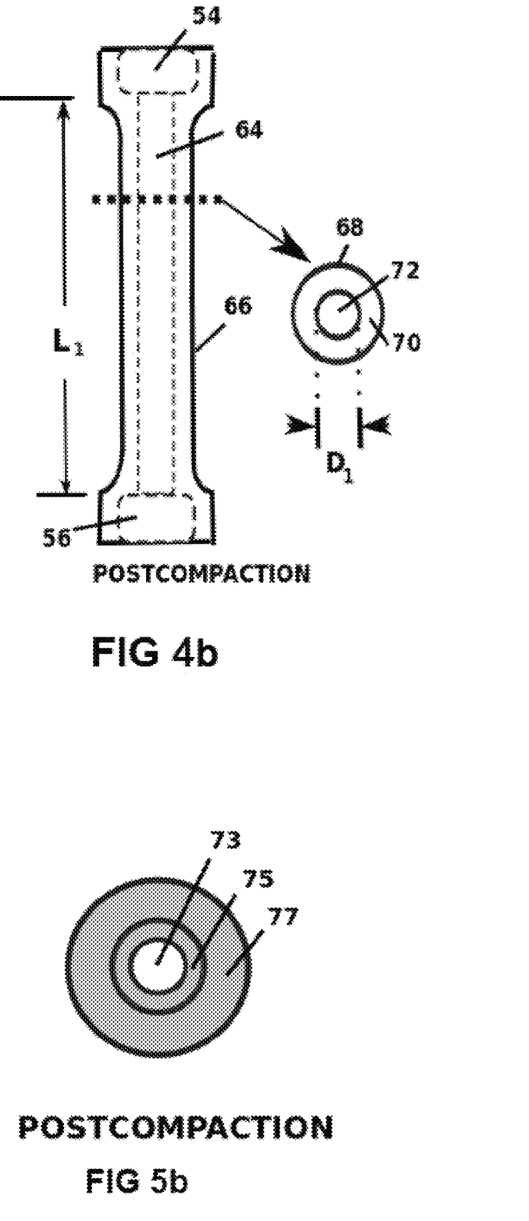

FIGS. 4a-4b respectively depict a powder tube before shock-wave compaction and after shock-wave compaction. Precompaction, the tube 50 is filled with powder 52 and is capped with plugs 54 and 56. The height of the powder 52 in the tube 50 is $L_0$. From a cross-section 58, the interior 62 of the tube cross-section 58 is seen to have a diameter of $D_0$. The thickness of the tube wall 60, before compaction, is $T_0$.

Postcompaction, the tube 66 surrounds the compacted material 64. Because of the energy of the shockwave, the tube 66 is deformed compared to the uncompacted tube 50. First, the tube 66 is elongated so that the length, $L_1$, of the compacted material 64 inside the tube is longer than the length, $L_0$, of the uncompacted powder 52. Further, the compacted tube 66 may also be longer than the uncompacted tube 50. A cross-section 68 of the compacted tube shows that the diameter, $D_1$, of the interior 72 of the tube is reduced from the diameter, $D_0$, of the uncompacted powder. Of particular note is that the wall 70 of the compacted tube 66 will have a greater wall thickness, $T_1$, than the wall 60 of the uncompacted tube 50 having wall thickness, $T_0$. This is due to plastic deformation in the tube due to shock loading.

The volume of the interior of the tube 50 precompaction, $V_0$, is calculated as:

$$V_0 = \pi\left(\frac{D_0}{2}\right)^2 L_0 \quad (3)$$

The volume of the compacted material 64 after passage of the shockwave, $V_1$, is some fraction, F, of the original tube volume, where 0<F<1, and may be calculated as:

$$V_1 = FV_0 = \pi\left(\frac{D_1}{2}\right)^2 L_1 \quad (4)$$

The volume of the wall of the tube will be the same for precompaction and postcompaction and yields the relation:

$$(D_0 T_0 - T_0^2)L_0 = (D_1 T_1 - T_1^2)L_1 \quad (5)$$

where $T_0$ is the precompaction wall thickness of the powder tube and $T_1$ is the wall thickness postcompaction, after passage of the shockwave. The initial values $L_0$, $D_0$ and $T_0$ are known and equation (3) can be used to calculate initial volume, $V_0$. The amount by which the volume is reduced under shock loading depends upon the type of powder, the tap density, the type of explosive that is used and the geometry of the set-up. For example, the initial tap density obtained by using an axial press for precompaction may be on be on the order of 50% of the theoretical density of bulk crystalline material. With a well-designed set-up, after shockwave passage, the resulting compacted material will have a density of 95% to 100% of the theoretical density. Since the mass is unchanged, the volume changes inversely to the density so the fraction of the original volume might be on the order of F=0.5/0.98=0.51. In this example, the elongation of the tube might be on the order of 7%. So the length of the tube postcompaction will be on the order of $L_1=1.07*L_0$ and using equation (4), the diameter of the post compaction tube can be calculated to be $D_1=0.69*D_0$. Then equation (5) can be used to calculate $T_1$. The thickness, $T_1$, of the postcompaction tube is always greater than the precompaction thickness, $T_0$, and is a function of both the initial wall thickness $T_0$ and the postcompaction diameter $D_1$. Because the wall of the tube is transitioning from thickness $T_0$ to thickness $T_1$ in the time that it takes for a shock wavefront to pass down the tube (under 100 µsec), the tube is undergoing very high stresses and plastic deformation and this results in high wall temperatures being generated. In fact, the tube can become much warmer than the material being consolidated, in which case, as the tube cools due to contact both with the consolidated material and contact with outside air, it will apply pressure to the consolidated material. The result is that post-consolidation, the now-consolidated material will be maintained under pressure within the cooled tube.

FIGS. 5a-5b respectively depict cross-sections of the explosive shock-wave setup, both precompaction and postcompaction, with a double tube assembly. In this setup, powder 65 is sealed within a powder tube 67, such as in the manner previously discussed above. A second tube, called a flyer tube 71, has a larger interior diameter than the outer diameter of the powder tube 67 so that the powder tube can be placed inside the flyer tube. Precompaction, there is a gap 69 separating the powder tube 67 and flyer 71 tube. The gap 69 is simply a space and could be filled with air, vacuum or any arbitrary gas. When a shockwave is applied, it causes the flyer tube 71 to impinge onto the powder tube 67 and both tubes are reduced in diameter with a corresponding increase in tube wall thickness. The result is that the gap 69 in the precompaction assembly is eliminated, and postcompaction, the powder 65 is consolidated into a dense mass 73 and is enclosed within two nested thickened tubes 75 and 77. In particular, since the flyer tube 71 must "close the gap", it undergoes more deformation than the powder tube, causing more heating and creating more inward pressure as it cools. This can yield higher static pressures on the consolidated mass 73 postcompaction than can be achieved using the same powder tube 67 without a flyer tube 71. In some embodiments, the flyer tube 71 and the powder tube 67 need not be made of the same material. In other embodiments, it may be desirable to use the same material for both the flyer tube 71 and the powder tube 67, including a postprocessing treatment. In this case, the postcompaction flyer tube 77 and postcompaction powder tube 75 may merge into a single composite tube wall.

Figure 6:
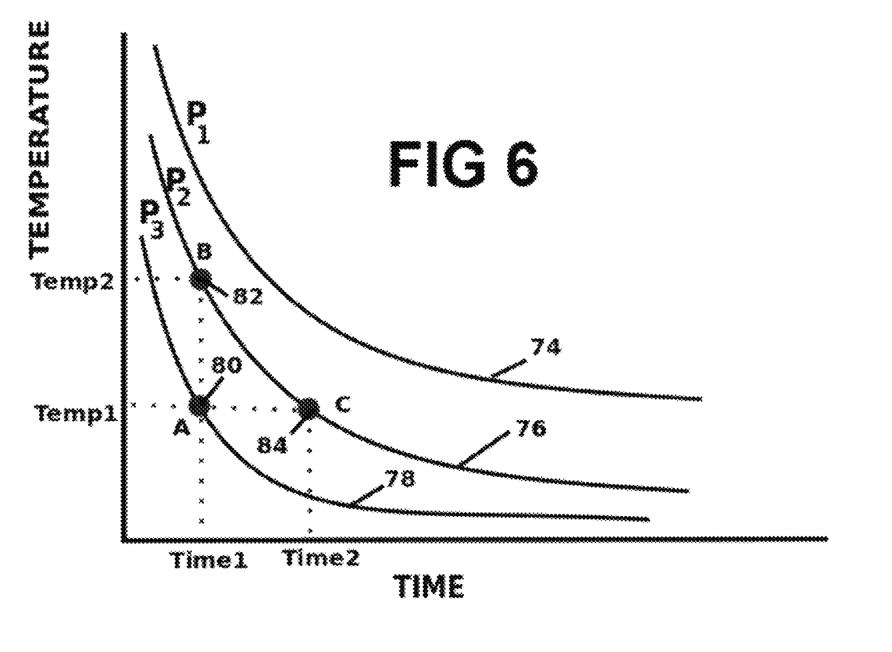
FIG. 6 depicts curves corresponding to the required temperature, time and pressure conditions required to accomplish a given heat treatment task.

FIG. 6 depicts representative curves relating the temperature, pressure and processing time required to accomplish a given post-processing heat treatment task. Such a heat treatment may be desirable to obtain satisfactory interparticle bonding or to complete void closure and densification after a consolidation. The heat treatment requires a combination of temperature, pressure and time. The curves 74, 76 and 78 correspond to applied pressures $P_1$, $P_2$ and $P_3$, respectively, where $P_1<P_2<P_3$. For example, if the density of the compact after shockwave powder consolidation is 97% and the objective is to obtain a 99% density, then a set of curves corresponding to this objective could be generated and might look similar to the depiction in FIG. 6. From FIG. 6, it can be seen that if a pressure of $P_3$ is applied at a temperature of Temp1 it requires a heat processing time of Time1 to accomplish the desired task. This combination is denoted by node A 80. If the same objective is desired at a lower pressure, $P_2$, then it can be done in the same time at a higher temperature, Temp2 which is point B 82, or the objective can be accomplished by the same temperature but for a longer time Time2 which is point C 84. So, nodes A, B and C depict three distinct sets of conditions to accomplish a specified post processing densification result. When the coefficient of thermal expansion of the confinement tube(s) is less than the coefficient of thermal expansion of the compact, then heating can be used to provide increased pressure since the tube(s) will expand at a slower rate than the compact. In other embodiments, if the coefficient of thermal expansion of the confinement tubes is greater than the coefficient of the compact, then cooling can be used to provide increased pressure since with a given reduction in temperature, the tube(s) will contract more than the compact. Heating, even at temperatures far below the melting point of the compact, can cause relief of microstrain without grain growth. When the microstrain is a desired property, applying pressure by cooling can serve to preserve it. Different parameter sets can yield differences in the grain size that is obtained in the bulk material, even while accomplishing the same degree of densification. The importance of this can be seen by considering the equation governing grain growth, given by:

$$D_0-D=(kt)^{(1/n)} \quad (6)$$

Where $D_0$ is the original grain size, D is the instantaneous grain size at time t, n is the grain growth exponent (n=2 for ideal grain growth), and k is a constant given by the Arrhenius equation:

$$k=k_0\exp(E_a/RT) \quad (7)$$

where $k_0$ is a temperature-dependent constant, R is the gas constant, T is the temperature, and $E_a$ is the pressure-dependent activation energy for grain growth.

Figure 7:
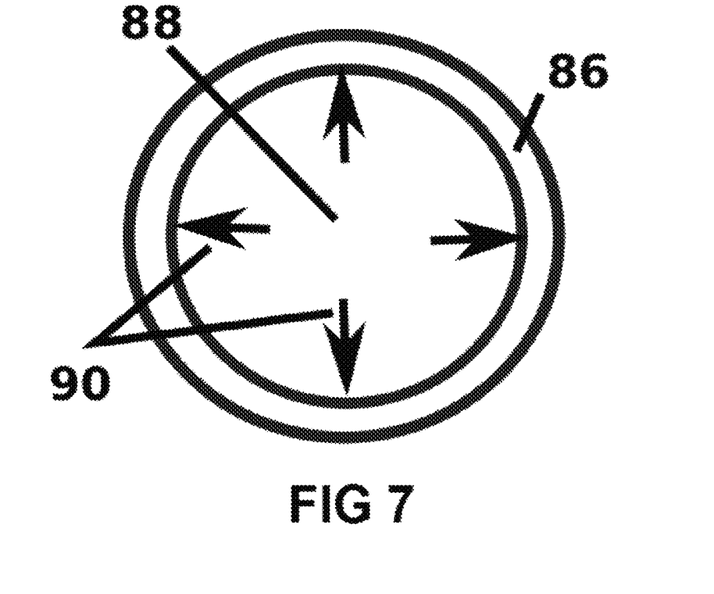
FIG. 7 depicts force lines of consolidate as they press against the tube wall.

FIG. 7 depicts a cross-section of a cylindrical pipe or tube when its contents (or the consolidate 88) are under pressure. The force 90 exerted by the consolidate 88 inside the tube is absorbed by tensile stresses in the tube wall 86. The tube wall 86 may be simply the original powder tube after it has been deformed by consolidation, or if one or more flyer tube(s) is used during shockwave consolidation, the tube wall 86 should be understood to be the combination of the flyer tube(s) and the powder tube. If the material of the tube wall 86 has a lower thermal coefficient of expansion than the consolidate 88, then when the entire assembly of tube wall and enclosed consolidate is heated, the wall 86 will apply an increasing inward force on the consolidate 88 and the consolidate 88 will apply an increasing outward force on the wall 86, thereby increasing the internal pressure of the consolidate 88. As long as the coefficient of thermal expansion for the consolidate 88 is greater than that of the wall 86, and assuming the forces on the wall do not exceed the wall yield strength, then any increase in temperature will serve to increase the internal pressure on the consolidate. If the coefficient of thermal expansion for the consolidate 88 is lower than that of the wall material 86, a decrease in temperature will serve to increase its internal pressure. The pressure applied to the consolidate 88 is not an independent variable, but will be a function of temperature and of the initial pre-stress that is applied to the consolidate 88 during shockwave consolidation. When higher pressures are to be applied, the tensile strength of the wall material becomes important and establishes the pressure limit. For example, the tensile strength of carbon steel is on the order of 0.25 GPa. Titanium has a tensile strength of 0.94 GPa and Maraging steel has a tensile strength of 2.6 GPa. So, when shockwave consolidation is used to consolidate a powder into a bulk material, if the coefficient of thermal expansion of the consolidated material differs from that of the tube that contains the powder, and if the tube wall after consolidation is sufficiently thick to avoid rupture, a post-processing thermal treatment can be applied to the entire tube, causing internal pressure that can promote interparticle bonding with less grain growth. This is attractive from a production standpoint since the tube itself has a role to play in the post consolidation thermal treatment and it is not necessary to detach the tube wall from the consolidate. In some embodiments, the entire assembly can simply be subjected to a thermal treatment, going straight from a consolidation and into an annealing oven or freezer without intermediate processing steps.

As an example of the scale of variation of thermal coefficients of expansion, consider the materials displayed in Table 1 below. For the materials listed in Table 1, the linear coefficients of expansion range from 12.0 μm/mK to 29.7 μm/mK. So, as a nonlimiting example, if it is desired to implement a heat treatment on the tube clad consolidated copper nanopowder, then for a pressurized heat treatment, the tube wall material would be chosen to be of a material with a thermal coefficient of expansion that is lower than 16.6 μm/mK, such as carbon steel, which has a coefficient of expansion of 12.0 μm/mK. Alternatively, by using a zinc tube to contain the powder during shockwave consolidation, the zinc tube may undergo plastic deformation that causes it to be warmer than the consolidated copper. Then, as the zinc tube cools, it shrinks relative to the consolidate. Due to the higher coefficient of thermal expansion of zinc relative to copper, the zinc tube applies pressure to the consolidate as it cools. The pressure can be increased further by actually refrigerating the tube. So a post-consolidation thermal treatment may be understood to be either the application of a temperature greater than ambient or the application of a temperature less than ambient for a desired period of time.

TABLE 1

Thermal Expansion Coefficients for Sample Materials

| MATERIAL | THERMAL EXPANSION COEFFICIENT (μm/mK) |
|---|---|
| Zinc | 29.7 |
| Lead | 28.0 |
| Aluminum | 22.2 |
| $Bi_{0.5}Sb_{1.5}Te_3$ | 21.3 |
| Copper | 16.6 |
| Bismuth | 13.3 |
| Nickel | 13.0 |
| Steel | 12.0 |

There may be situations where a pressure treatment is desirable, but without the use of high temperature treatments. For example, when densification is desired without relieving the strains within a material, the postprocessing objective may be satisfied by a cold treatment, whereby the material for the tube wall is chosen to have a higher coefficient of thermal expansion and the entire tube is subjected to refrigeration. So postprocessing can take place at temperatures both higher and lower than ambient depending upon the nature of the consolidate, the nature of the tube material and the material processing objective.

Figure 8:
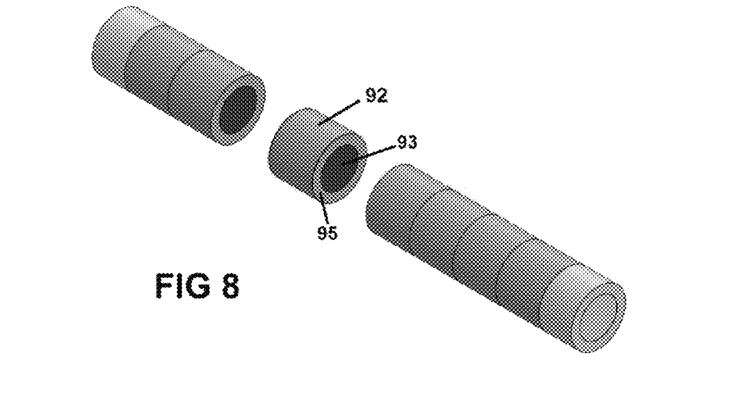
FIG. 8 depicts a segment that is cut from a tube after shock-wave consolidation.

FIG. 8 depicts the production of a section or, equivalently, segment 92 of a tube, post consolidation. Segment 92 is simply a cylindrical section which exposes the consolidate 93 and tube wall 95 on both ends. The segments 92 may be provided utilizing any suitable means, such as cutting with a diamond saw or band saw, parting on a lathe or using electrical discharge machining.

Figure 9A:
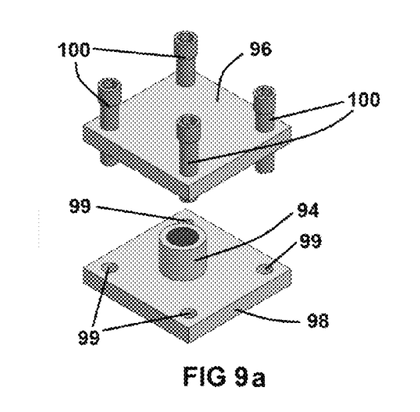
FIGS. 9a-9b respectively depict an exploded and assembled view of a clamped assembly to ensure a pressurized consolidate during thermal processing.
Figure 9B:
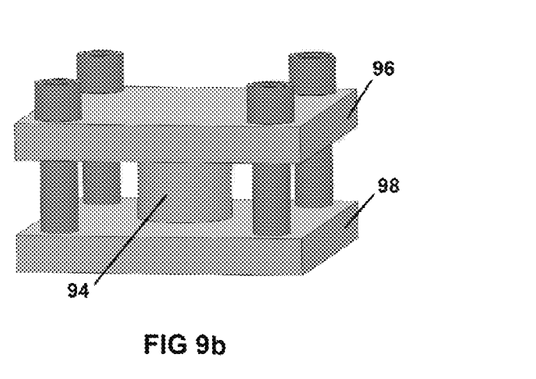

FIGS. 9a-9b depict an exploded and assembled view of a clamp utilized to apply a pressurized heat treatment to a consolidate after shockwave processing. As described previously, the tube material can be chosen to have a different thermal coefficient of expansion from the consolidate so that the tube wall may serve as a vehicle for pressurizing the consolidate during post processing thermal treatment. In this approach, a segment 94 that is cut from a consolidated tube is machined on the two ends so that its two ends are parallel. Then the segment is clamped between an upper plate 96 and a lower plate 98, such as by using four threaded bolts 100 or any other suitable fastening mechanism. The combination of the upper plate 96, lower plate 98, and four bolts 100 comprises a clamp. In one embodiment, holes in the upper plate 96 allow the bolts 100 to pass freely through the upper plate 96 while the holes 99 in the lower plate 98 are threaded. In this way, by securing the bolts 100, the ends of tube segment 94 are clamped on both ends as depicted in FIG. 9b. The entire assembly in FIG. 9b can then be subjected to a thermal treatment by placing the assembly into an oven or freezer. By carefully selecting the material for the bolts 100 so that they have a different coefficient of thermal expansion than that of the consolidate, the clamp that is formed by upper plate 96, lower plate 98, and bolts 100 serves to effectively seal and maintain the consolidate in a pressurized state during heating or cooling. After a desired thermal treatment, the segment 94 can be removed from the clamp and the tube wall can be detached from the consolidate.

Figure 10:
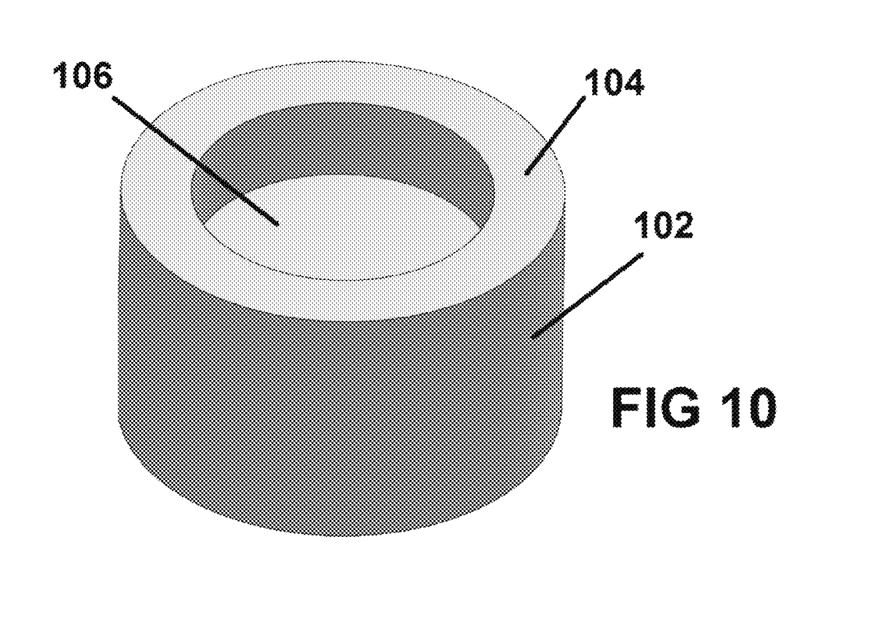
FIG. 10 depicts a segment from which a portion of the consolidate at the end has been removed.

FIG. 10 depicts an annular section 102 of a post-consolidated tube that is made by making two parallel slices in the tube. The consolidated material 106 inside of the tube wall 104 is mechanically processed to remove some of the material at the top and the bottom of the section 102. In FIG. 10 this amount is exaggerated for the purposes of illustration. In practice, the amount of material that is removed might be on the order of 1% or less of the total length from top to bottom. The material is removed in order to allow room for the consolidate to expand. Then this segment can be clamped as depicted in FIG. 9b, so as to prevent the consolidated material 106 from expanding beyond the limits imposed by the clamp during heat treatment, which may be desirable for controlling grain growth orientation. When the complete assembly, including clamp and section 102 is placed in an annealing furnace, if the coefficient of thermal expansion of the consolidate material is greater than that of the tube jacket, the consolidate 106 experiences pressure from the tube wall 104. However, since it is unconfined in the normal direction due to the void where the consolidated material was removed, then there will be lower pressure in the normal direction and grain growth will favor orientation in the normal direction. After treatment, when the tube wall is removed, the resulting material will be anisotropic with a defined grain orientation.

Figure 11A:
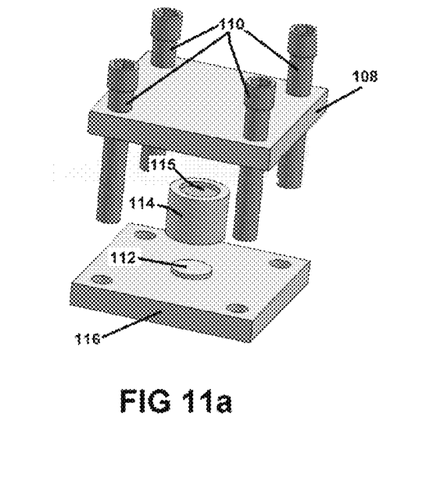
FIGS. 11a-11b respectively depict exploded and assembled view of a clamp mechanism in which an extension is provided.
Figure 11B:
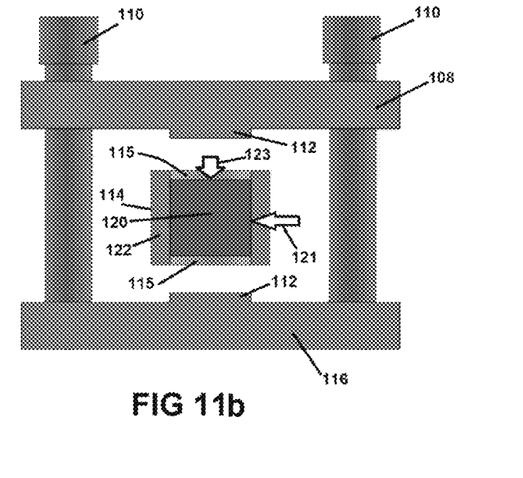

FIGS. 11a-11b respectively depict exploded and assembled views of a clamp mechanism where a clamp mechanism has been designed to provide a controlled pressure in the normal direction to a segment of consolidate in order to control grain growth or other material properties. In this embodiment, a raised area 112 is provided on a top plate 108 and bottom plate 116 in order to fit into voids 115 that have been taken out of the top and bottom of the consolidate in a segment 114 of consolidated tube. FIG. 11b provides a cross-sectional view showing raised areas 112 on the top plate 108 and bottom plate 116 that fit into the void 115 when the clamp mechanism is closed upon the segment 114. Clamping could be accomplished by using bolts 110 or any other suitable fastening mechanism to bring the top plate 108 and bottom plate 116 together until they are blocked by contact between raised areas 112 and either the segment wall 122 or the consolidate 120. Through the careful selection of material and diameter for bolts 110, a desired pressure profile along the axis of the consolidate 120 could be implemented during thermal treatment, allowing a different pressure in the radial direction 121 from that in the axial direction 123. Although this implementation assumes a cylindrical segment that is cut from a cylindrical tube, it should be recognized that shock consolidation can be applied in settings other than a cylindrical tube in order to densify a small grained powder and the resulting post-consolidation assembly might be subdivided into portions other than annular rings for post-consolidation thermal processing to exploit a mismatch in thermal coefficients of expansion. Although the examples discussed involve a shockwave consolidated sample, the post processing pressurized thermal treatment envisioned could also be applied to samples that are consolidated by other means. As non-limiting examples, consolidated powder may be provided by any suitable static compression technique including isostatic pressing, uniaxial die compaction, or the like. If said static compression occurs within a rigid wall, the resulting compacted powder/rigid wall can be clamped and subjected to a thermal treatment in the same way as a shockwave consolidated sample.

Figure 12:
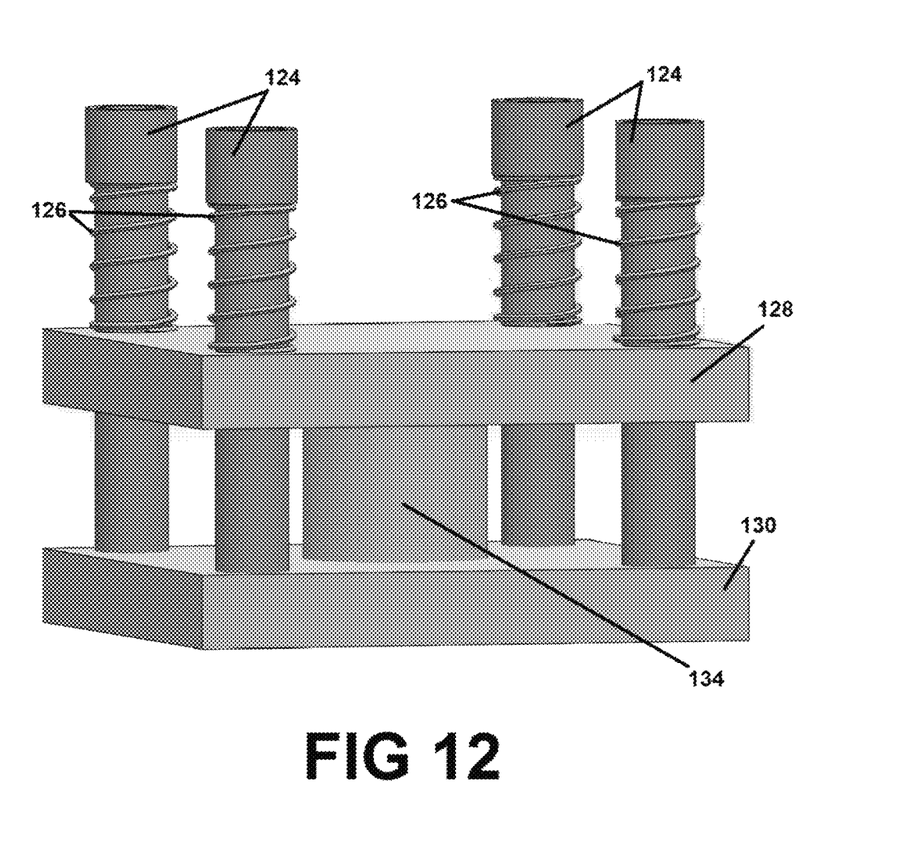
FIG. 12 depicts a clamp system in which springs are used with a clamp to allow an adjustable pressure in the normal axis to control an anisotopic grain growth.

FIG. 12 depicts a clamped segment whereby springs 126 are used to implement a clamping pressure in the axial direction. In this embodiment, top plate 128 has holes through which the bolts 124 slide freely and bottom plate 130 has threaded holes into which bolts 124 are screwed. Springs 126 are disposed between the heads of bolts 124 and the top plate 128. By adjusting the positions of bolts 124, the springs 126 can be set in compression to apply a desired force on top plate 128, resulting in a desired pressure profile applied axially to the consolidate that is inside segment 134. The desired force would be the sum of both the spring force and the gravitational weight of top plate 128. As an alternative embodiment, springs in compression could be positioned between the top plate 128 and the bottom plate 130 in order to reduce the axial pressure applied to the consolidate inside segment 134.

Embodiments described herein are included to demonstrate particular aspects of the present disclosure. It should be appreciated by those of skill in the art that the embodiments described herein merely represent exemplary embodiments of the disclosure. Those of ordinary skill in the art should, in light of the present disclosure, appreciate that many changes can be made in the specific embodiments described and still obtain a like or similar result without departing from the spirit and scope of the present disclosure. From the foregoing description, one of ordinary skill in the art can easily ascertain the essential characteristics of this disclosure, and without departing from the spirit and scope thereof, can make various changes and modifications to adapt the disclosure to various usages and conditions. The embodiments described hereinabove are meant to be illustrative only and should not be taken as limiting of the scope of the disclosure.

What is claimed is:

1. A method for preparing a bulk material comprising the steps of:
   placing a powder into a container;
   using a consolidating method to convert said powder into a compact that is a solid; and
   applying a thermal treatment to said container and compact, wherein the thermal treatment enhances densification and inter-particle bonding of the compact.

2. The method of claim 1, wherein said container is made from a ductile material that undergoes plastic deformation when subjected to a shockwave.

3. The method of claim 1, wherein the container is aluminum, carbon steel, zinc, lead, aluminum, copper, bismuth, nickel, or another form of steel.

4. The method of claim 1, wherein a first coefficient of thermal expansion of said container is greater than a second coefficient of thermal expansion of said powder.

5. The method of claim 4, wherein the thermal treatment is cooling of the container and compact.

6. The method of claim 1, wherein a first coefficient of thermal expansion of said container is less than a second coefficient of thermal expansion of said powder.

7. The method of claim 6, wherein the thermal treatment is heating of the container and compact.

8. The method of claim 1, wherein a difference between a first coefficient of thermal expansion of said container and a second coefficient of thermal expansion of said powder causes pressure to be applied to said compact during the thermal treatment.

9. The method of claim 1, wherein the consolidating method is an explosive shock-wave consolidation that causes deformation of the container, and after shock-wave consolidation said compact is under pressure from the container.

10. The method of claim 1, wherein the consolidating method is static compression, isostatic pressing, or uniaxial die compaction.

11. The method of claim 1, wherein the container is a tube, cylinder, right circular cylinder, elliptic cylinder, parabolic cylinder, or hyperbolic cylinder.

12. The method of claim 1 further comprising:
   sectioning the container and compact into two or more segments after performance of the consolidating method, wherein a remaining wall surrounding the compact remains intact around the compact, and at least one of the segments is subjected to the thermal treatment.

13. The method of claim 12 further comprising:
   positioning the at least one segment in a clamp prior to the thermal treatment, wherein the clamp maintains the segment in a pressurized state during the thermal treatment.

14. The method of claim 12 further comprising:
   removing a layer of material from the compact of the at least one segment prior to the thermal treatment, wherein the layer of material removed results in low pressure in an unconfined direction.

15. The method of claim 14 further comprising:
   positioning the at least one segment in a clamp prior to the thermal treatment, wherein the clamp provides a raised area that fits into a void left by the layer of material removed from the compact.

16. An apparatus for forming a bulk material from a powder, the apparatus comprising:
   a container for receiving the powder, wherein a difference between a first coefficient of thermal expansion of said container and a second coefficient of thermal expansion of said powder causes pressure to be applied to said powder during the thermal treatment;

a means for consolidating the powder in the container, wherein the powder is consolidated into the bulk material; and a thermal treatment device for thermal treatment of the bulk material, wherein the thermal treatment device heats or cools the bulk material.

17. The apparatus of claim 16, further comprising:

a clamp arranged to receive a sectioned portion of the container and the bulk material prior to the thermal treatment, wherein the clamp maintains the bulk material in a pressurized state during the thermal treatment.

18. The apparatus of claim 16, wherein the clamp comprises:

a first plate that engages a first exposed area of the sectioned portion of the container and the bulk material;

a second plate that engages a second exposed area of the sectioned portion of the container and the bulk material, wherein the first and second plate cover any exposed regions of the sectioned portion of the container and the bulk material; and a plurality of fasteners securing the first and second plate together.

19. The apparatus of claim 16, further comprising a plurality of springs coupled to the fasteners, wherein the plurality of springs implement clamping pressure.

20. The apparatus of claim 16, wherein the plurality of fasteners have a first coefficient of thermal expansion that is different from a second coefficient of thermal expansion the powder.

21. The apparatus of claim 16, wherein a layer of the bulk material is removed before thermal treatment.

* * * * *